UNITED STATES PATENT OFFICE.

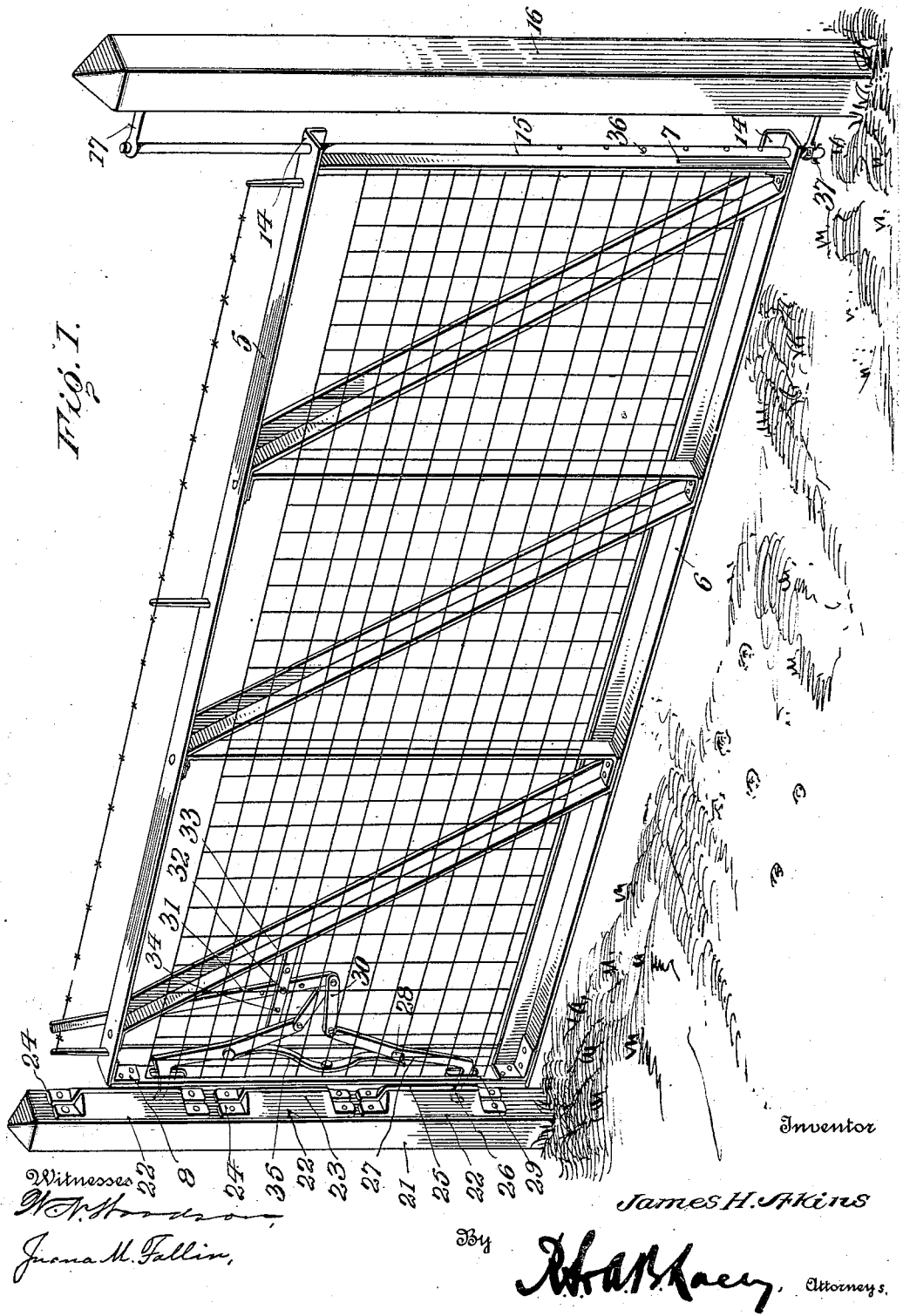

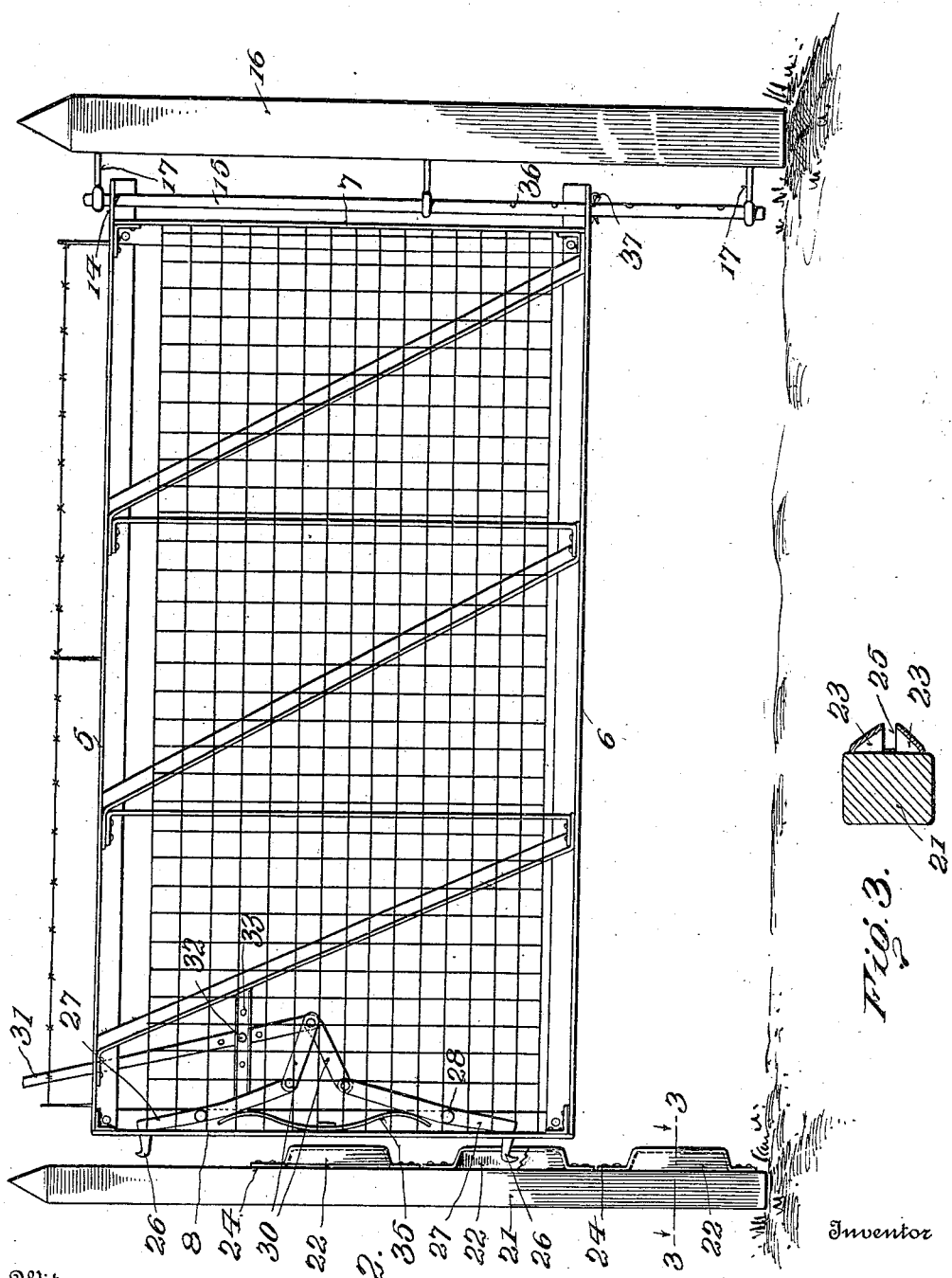

JAMES H. AKINS, OF OREGON, ILLINOIS.

GATE-LATCH.

990,511.  Specification of Letters Patent.  Patented Apr. 25, 1911.

Application filed January 31, 1910. Serial No. 541,111.

*To all whom it may concern:*

Be it known that I, JAMES H. AKINS, citizen of the United States, residing at Oregon, in the county of Ogle and State of Illinois, have invented certain new and useful Improvements in Gate-Latches, of which the following is a specification.

This invention relates to gates and more particularly to a novel form of latch especially designed for use in connection with farm gates.

The object of the invention is to provide a gate or other closure having a plurality of pivotally connected latches movable into engagement with suitable keepers on the adjacent post so as to lock the gate against swinging movement when in different positions of vertical adjustment.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof and also to acquire a knowledge of the details of construction and the means for effecting the result, reference is to be had to the following description and accompanying drawings, in which:

Figure 1 is a perspective view of a gate provided with a latch constructed in accordance with my invention, showing the gate in lowered or normal position; Fig. 2 is a side elevation of the gate showing the same elevated; Fig. 3 is a transverse sectional view taken on the line 3—3 of Fig. 2.

Corresponding and like parts are referred to in the following description and indicated in all the views of the drawings by the same reference characters.

The gate comprises an elongated supporting frame, preferably formed of metal and including upper and longitudinal angle bars 5 and 6 connected by vertical end bars 7 and 8 also preferably formed of angle iron, as shown.

The longitudinal bars 5 and 6 are projected beyond the adjacent end bar 7 to form spaced arms 14 having vertically alined openings to receive a rod or pin 15, which latter constitute the pivotal axis of the gate and is secured in spaced relation to the adjacent gate post 16 by one or more brackets 17.

Secured to the inner face of the mating post 21 are a plurality of spaced keepers 22 each consisting of co-acting plates 23 having their opposite ends bent to produce attaching lugs 24 for engagement with the fence post, and their inner longitudinal edges spaced apart to form an intermediate opening 25 adapted to receive the angular fingers 26 of the adjacent latches 27. The latches 27 are each pivotally mounted at 28 on the forward end bar 8, while the fingers 26 thereof project through suitable openings 29 formed in said end bar so as to enter the openings 25 in the keepers when the gate is swung to closed position. The inner ends of the latch levers 27 are bent inwardly and connected through the medium of diverging links 30 with an operating lever 31, the latter being pivotally mounted at 32 on a cross bar 33 connecting the end bar 8 and the adjacent inclined brace 11. Suitable openings 34 are formed in the cross bar 33 and operating lever 31 so as to permit adjustment of the operating lever and thus vary the throw of the latch levers.

Attention is here called to the fact that the side plates 23 constituting each keeper are inclined laterally in opposite directions so that when the gate is swung in either direction to closed position, the fingers 26 will bear against the adjacent plates 23 and press the latch levers 27 inwardly against the tension of the spring 35, the fingers 26 of the levers being movable within the slots 25 of the keepers by the action of said spring when the fingers register with said slots.

The intermediate portion of the spring 35 is rigidly secured to the end bar 8, while the opposite ends thereof bear against the latch levers 27 near their pivotal axes 28 so that the fingers 26 of said latch levers are normally and yieldably disposed in the path of the adjacent keepers.

Suitable openings 36 are formed in the rod 15 so that by adjusting the gate vertically of the post and inserting a pin 37 in the openings 36, the gate may be supported in adjusted position so as to clear snow drifts and also to prevent the passage of hogs thereunder.

When the gate is in lowered position, the latches engage the upper and lower keepers, and when the gate is adjusted vertically of the rod 15 to clear snow drifts or for other purposes, the lower latch lever engages the intermediate keeper, thus providing a means for holding the gate in closed position regardless of the height of said gate above the surface of the ground.

It will here be noted that the openings 25 in the keepers not only form pockets for the fingers 26 of the latch members, but also permit vertical adjustment of the gate, the pockets in said keepers permitting free sliding movement of the fingers within the keepers during the vertical adjustment of said gate.

Having thus described the invention, what is claimed as new is:

1. The combination with a closure having spaced openings formed in one end thereof, of latch members having their intermediate portions pivotally mounted on the closure and their outer ends provided with angularly disposed fingers extending through the openings in the closure for engagement with suitable keepers, an operating lever having its intermediate portion pivotally mounted on the closure, and converging links forming a pivotal connection between the lower end of the operating lever and the inner ends of the latch-members.

2. The combination with a closure having spaced openings formed in one end thereof, of latch members having their intermediate portions pivotally mounted on the closure and their outer ends provided with angular terminals extending through the openings in the closure for engagement with suitable keepers, an operating lever having its intermediate portion pivotally mounted on the closure, converging links having their diverging ends pivotally connected with the inner ends of the latch members and their converging ends pivotally connected with the lower end of the operating lever and with each other, and a leaf-spring having its intermediate portion secured to the closure opposite the links, and its terminal portions deflected laterally for engagement with the adjacent longitudinal edges of the latch members.

3. The combination with spaced keepers having vertically disposed slots therein and provided with inclined side faces converging in the direction of the slots, of a closure, latch members having their intermediate portions pivotally mounted on the closure and provided with terminal fingers movable over the inclined faces of the keepers into the adjacent slots thereof, an operating lever pivotally mounted on the closure, and converging links having their diverging ends pivotally connected with the inner ends of the latch members and their converging ends pivotally connected with the operating lever and with each other.

In testimony whereof I affix my signature in presence of two witnesses.

JAMES H. AKINS. [L. S.]

Witnesses:
ALBERT M. BAKER,
G. E. MEDLAR.

---

Copies of this patent may be obtained for five cents each, by addressing the "Commissioner of Patents, Washington, D. C."